July 22, 1958 F. OSTWALD 2,844,161
FLUID PRESSURE REGULATORS
Filed Oct. 18, 1954 2 Sheets-Sheet 1

July 22, 1958  F. OSTWALD  2,844,161
FLUID PRESSURE REGULATORS
Filed Oct. 18, 1954  2 Sheets-Sheet 2

United States Patent Office 2,844,161
Patented July 22, 1958

2,844,161

FLUID PRESSURE REGULATORS

Fritz Ostwald, Heppenheim, Bergstrasse, Germany, assignor to Alfred Teves Maschinen- und Armaturenfabrik Kommandit-Gesellschaft, Frankfurt am Main, Germany Application October 18, 1954, Serial No. 462,981

Claims priority, application Germany December 4, 1953

5 Claims. (Cl. 137—118)

The present invention relates to fluid pressure regulators.

The invention has for its object, the provision of a fluid pressure regulator which makes it possible to control the pressure in a branch conduit in any desired relation to the changing pressure in another or main conduit thereby to constantly maintain a predetermined pressure ratio between said conduits. Thus, it enables regulation of the pressure in a branch line of a fluid pressure system acting in dependence on the pressure maintained in the main line.

This interdependence of pressures has general application in many fields, as in control mechanisms for compressed air installations, in mixing units for liquids, also in brakes for motor vehicles. In applying the present invention to brakes for motor vehicles, wherein the pressures in the several parts of the conduit connecting the brakes are in a predetermined ratio to each other, pressure regulation occurs both while the pressure is rising and while it is falling.

Other and further objects of the invention reside in the structures and arrangements hereinafter more fully described with reference to the accompanying drawings in which.

Figure 1:
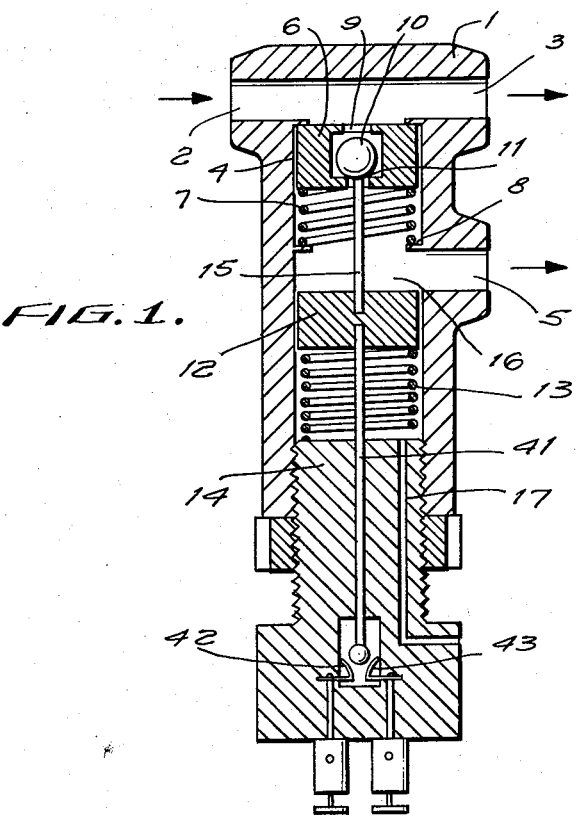
Fig. 1 is a sectional front elevation of a pressure regulator in the form of a brake power distributor for vehicle brakes constructed in accordance with the principles of the invention.

Referring now to Fig. 1, the regulator casing 1 is provided with an inlet conduit 2 interconnected with an outlet conduit 3. Extending along a portion of the length of the casing there is a cylindrical perforation or opening 4. Another conduit 5 connects with the opening 4 and branches off therefrom to provide a second outlet.

A control member 6 is positioned in the opening 4 for sliding movement therein. The control member 6 is slidably moved in one direction by the spring 7 which abuts the member 6 at its one end and stopped from movement by the brace or shoulder 8, at its other end. The control member 6 is provided with an axial bore 9 in which valve 10 is movable. In the drawing the valve 10 is shown as a ball or other spheroid; however, it will be recognized that valves of other shapes may be equally applicable. Formed at the base of the axial bore 9 is a seat 11 which cooperates with the valve 10 to effect a blocking of fluid entering through the bore 9 from the inlet-outlet conduits 2, 3. Although not shown, a spring or other suitable resilient biasing means may be placed in the bore 9 to urge the valve toward engagement with the seat 11.

Positioned along an intermediate portion of the opening 4 and below the outlet conduit 5 is a movable piston 12. A spring 13, arranged between the piston 12 and the screw plug 14, yieldingly urges the piston toward the outlet 5; the normal height to which the piston 12 is moved in the opening 4 and with respect to the outlet being controlled by the amount to which the screw plug 14 is threaded into the opening. Supported on one end of the piston 12 is a stem 15 which, in the normal position of the piston, extends into the lower portion of the bore 9 just sufficiently to make contact with the valve 10 and to lift it off its seat 11.

A pressure compartment 16 is formed in the opening 4 immediately above the piston 12 and below the control member 9 for a purpose to be described. Air exhaust opening 17 is provided in the screw plug 14, also for a purpose to be described.

During normal operation of the regulator, fluid pressure is transmitted from the inlet conduit 2 without change, into the outlet conduits 3 and 5; the fluid being transmitted to outlet conduit 5 through the bore 9, valve 10 and by way of pressure compartment 16. Hence, during normal operation the impact of the fluid pressures on both the top and bottom of the control member 6 are equal. Accordingly, the pressure in the pressure compartment 16 is such as not to be of sufficient force as to move the piston 12 against the effect of its spring 13. As a result, the elements remain at rest without being disturbed by the passage of the fluid.

Any rise in fluid pressure as the fluid is conducted from inlet 2 to outlet 3 would ordinarily result in a similar rise in pressure in the outlet conduit 5, however, in order to retain the predetermined different ratios of fluid pressures in the conduits 2, 3 and 5 any increase in pressure in pressure compartment 16 will be transmitted immediately to the upper surface of the piston 12. The increased pressure will move the piston 12 downwardly in opposition to the resisting spring 13.

Movement of the piston 12 correspondingly moves the stem 15 which, in turn, controls the space between the valve 10 and the seat 11. The air exhaust 17, previously mentioned, permits the free exhaust of air from the space between the piston 12 and the screw plug 14.

By the downward movement of the stem 15 (with the piston 12), the valve 10 is permitted to move closer to its seat 11 to progressively limit the fluid and the fluid pressure entering the pressure compartment 16. Thus, the fluid pressure in the compartment 16 controls the extent of the movement of the piston 12 which in turn, by allowing the valve 10 to variably meter the fluid entering the compartment, controls the fluid pressure in the compartment.

When the valve 10 is permitted to come to rest on its seat 11 the fluid passage from conduits 2, 3 to compartment 16 and conduit 5 is cut off and the pressure in the compartment and in the conduit 5 will remain constant and cease to increase. If, however, the pressure in conduits 2 and 3 continues to increase still further, the control member 6 will be caused by the increased pressure, to slide in opposition to the spring 7. The valve 10 being retained by stem 15 in its position relative to the opening 4, will become unseated from the seat 11 as the control member 6 moves downwardly. Unseating of the valve 10 will then again permit the fluid to flow into the compartment 16 and accordingly increase the fluid pressure therein. The increased pressure in compartment 16 will immediately produce a downward displacement of the piston 12 to close the bore 9 by allowing valve 10 to seat.

Obviously, it will be understood that the operations as described above will be accomplished in rapid succession as the pressure changes occur. The operations are not intended to be discontinuous. As a result, the difference in the ratios of fluid pressures in the conduits 2, 3 and 5 will be kept constant. The created differences in pressures will, of course, depend upon the curves of resilience of the springs which are utilized, and the relation of the seat area 11 to the piston areas of the member 6, and the piston 12.

In the description above the resilient members 7 and 13 have been shown and described as being springs. Springs with a straight characteristic are characterized by a snapped-off straight line, however, it is possible to employ other resilient members, such as rubber. Rubber members have progressive characteristics capable of being strained under the influence of pressure without rupture. Hence by carefully choosing the resilient members, the fluid pressure ratios introduced in the conduits may be varied as desired.

Figure 2:
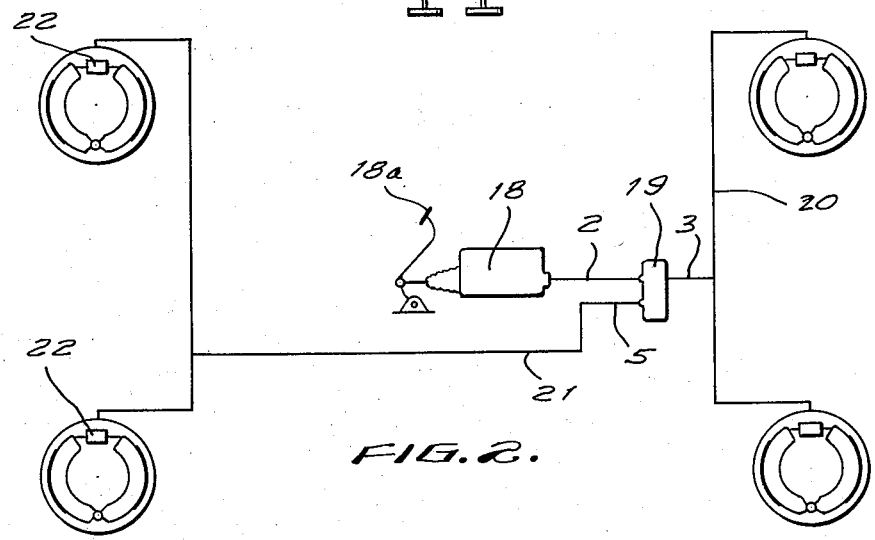
Fig. 2 is a diagrammatic view of a brake arrangement for a motor vehicle with the pressure regulator incorporated therein.

Fig. 2 is a diagrammatic showing of the pressure regulator of the instant invention incorporated into the brake system of a motor vehicle. In the system shown in the drawing the main cylinder 18, being of well known construction, is acted upon by the brake pedal 18a to produce a braking pressure in the system. The pressure is then transmitted by way of conduit 2 to the pressure regulator, identified in Fig. 2 by the numeral 19.

The pressure regulator 19 is employed in the system as a brake power distributor through which the fluid pressure is transmitted undiminished by way of outlet conduit 3 to the front brake line 20. Rear brakes 22 receive their braking pressure by way of outlet 5 and the rear brake line 21.

It is well known that a variable ratio must exist between the braking pressures of the front and rear axles of a vehicle, due to the dynamic axial load distribution, and so that the power drive of the wheels may be fully utilized at all times. Therefore, the ratio of pressures which should exist between the conduits 20 and 21 may be predetermined in a well known manner based on the design of the vehicle. Then, by adjusting the pressure regulator 19 in accordance with the predetermined ratios, the required ratio of braking pressures may be set up and controlled automatically.

Figure 3:
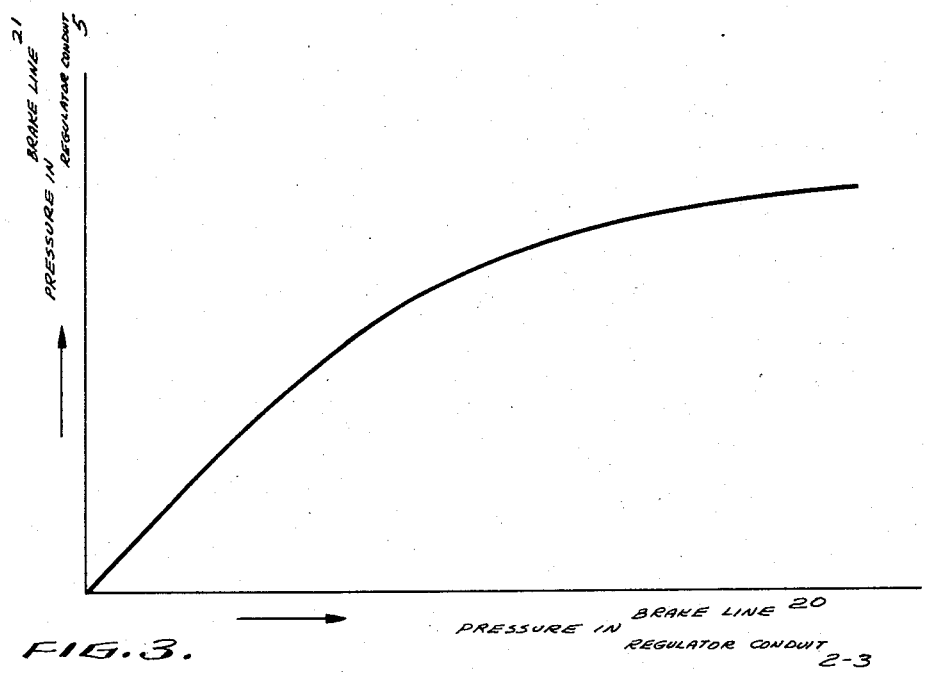
Fig. 3 is a chart of the characteristic curve of the pressure regulator.

The chart in Fig. 3 is a graphic example of the required pressure ratios produced by the regulator 19 in line 20, which is a continuation of conduits 2 and 3, and in line 21, which is a continuation of conduit 5.

Figure 4:
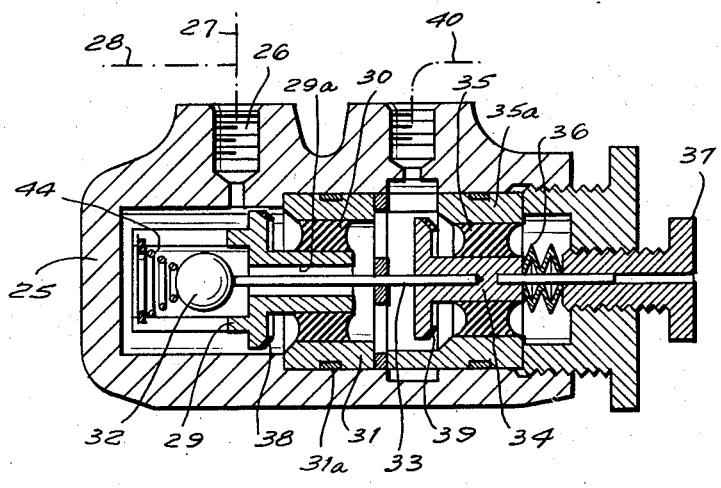
Fig. 4 is a sectional side view of a modified embodiment of the regulator.

In the modified embodiment of the pressure regulator shown in Fig. 4 wherein there are two flow-regulating valves, the casing 25 is connected by way of connection 26 with a pressure line 27. In practice the pressure line 27 branches off to a flow control 28 just before its connection with the casing 25.

Slidable within the casing 25 is a control member 29 connected by way of ring 30 with a box 31. The box 31 is fixed in the casing 25 from movement relative thereto. A seal ring 31a is seated in a groove in the box 31 and coacts with the wall of the casing 25 to prevent leakage of fluid therebetween. The rubber ring 30 which interconnects the member 29 with the box 31 is vulcanized along its outer periphery to the box and along its inner periphery to the member 29, thereby forming a fluid seal between the box and control member. Because of its resilience the ring 30 serves also as a resilient biasing means between the non-movable box 31 and the axially movable control member 29.

Provided in the control member 29 is an axial bore 29a having a seat (not numbered) which cooperates with the ball or spheroidal valve 32 to close off the axial bore. The valve 32 is spring urged into engagement with its valve seat by a spring 44 while, on the other hand, the valve is lifted from its seat in opposition to the spring by one end of the stem 33.

The other end of the stem 33 is supported on the axially movable part 34. The axially movable part 34 is vulcanized along its outer periphery to a rubber ring 35 which is, in turn, vulcanized to a box 35a; the box 35a being of substantially the same construction as the box 31. Positioned at the end of the part 34 are springs 36 which exert a moving force on the part, the moving force being adjustably controllable by the screw plug 37.

Formed on the member 29 is a seat 38, and formed on the part 34 is the seat 39; the two seats being adapted to lean or seat on the casing 25 when the pressures in the casing rise to such an extent that the rubber parts 30 and 35 respectively might be subject to damage.

Operation of the modified embodiment is substantially the same as that described in the embodiment shown in Figs. 1 and 2. The fluid pressure in the line 40 is regulated in a predetermined ratio with the fluid in lines 27 and 28.

The occurrence of an increase in fluid pressure entering the casing 25 by way of lines 27 and 28 will automatically force the part 34 to the right in opposition to the springs 36. Accordingly, the stem 33 will move to let the ball valve 32 seat on the end of bore 29a. When valve 32 is seated, the pressure exerted on part 34 will no longer increase. However, as described in the operation of Figs. 1 and 2, a further increase in fluid pressure will cause the member 29 to move axially relative to the stem 33 to unseat the valve 32 again.

The fluid pressure which then passes through the bore 29a will act on the part 34 to move it once again so that the valve 32 will be permitted to seat itself over the bore. This continuous operation will go on until the surfaces 38 and 39 are stopped by the casing 25, or until the fluid pressure entering the casing by way of lines 27 and 28 decreases.

In the embodiments shown in Figs. 1 and 2, and in Fig. 4, the parts 12 and 34 respectively may be employed to operate an indicator utilizing the movements of these elements in their respective casings. For example, in Fig. 1 the piston 12 is provided with an indicator stem 41 which is displaced by the movements of the piston. When the stem is displaced into the screw plug 14 it moves between the contacts 42 and 43 to close an electrical indicating circuit which then indicates the extent of the fluid pressure being exerted on the piston 12.

It is also within the contemplation of the present invention that the pistons 6 and 12, or the rubber portions 29, 30, 31, 34 and 35 may be replaced by diaphragms, bellows or other similar structures.

While there have been shown and described and pointed out the fundamental novel features of the invention as applied to several preferred embodiments thereof, it will be understood that various omissions and substitutions and changes in the form and details of the devices illustrated and in their operations may be made by those skilled in the art, without departing from the spirit of the invention. It is the intention, therefore, to be limited only as indicated by the scope of the claims appended hereto.

What is claimed is:

1. A fluid pressure regulator comprising a casing having high pressure and low pressure conduits, a control member slidable in said casing, progressively acting resilient means cooperating with said control member to regulate its sliding movement, a valve movable between open and closed positions intermediate said high pressure and low pressure conduits, piston means movable in said casing independently of said control member and under the influence of fluid pressure exerted thereon, said piston means having means cooperating with said valve to control the movements thereof between said open and closed positions, and progressively acting resilient means cooperating with said piston means to regulate the movement of the same in opposition to the influence of said fluid pressure.

2. A fluid pressure regulator as in claim 1, in which at least one of said resilient means has a curved line graph characteristic.

3. A fluid pressure regulator as in claim 1, a fluid pressure indicating means in said casing, and means cooperating with said piston means and movable therewith into cooperation with said indicating means to indicate the extent of the fluid pressure exerted on the piston.

4. A fluid pressure regulator as in claim 1, exteriorally adjustable means in said casing, said adjustable means cooperating with said last named resilient means to vary the tension thereof, and resilient means cooperating with said piston means to resiliently guide the movements of the same.

5. A fluid pressure regulator for a plurality of fluid motors having a difference in load to overcome comprising a casing having high and low pressure conduits, a control member slidable in said casing, progressively acting resilient means cooperating with said control member to regulate its sliding movement, a valve movable between open and closed positions intermediate said high and low pressure conduits, a piston movable in said casing independently of said control member under the influence of the pressure exerted by the fluid passing between said conduits, means movable with said piston and cooperating with said valve to control the movements of the same between its open and closed positions, progressively acting resilient means cooperating with said piston to regulate the movements of the same in opposition to the influence of said fluid pressure, and means adjustable in said casing to vary the characteristics of said last named resilient means to vary the fluid pressure ratio between said high and low pressure conduits corresponding to the dynamic load distribution of said motors.

References Cited in the file of this patent
UNITED STATES PATENTS

| | | |
|---|---|---|
| 2,189,224 | Roberts | Feb. 6, 1940 |
| 2,291,229 | Johnson | July 28, 1942 |
| 2,416,881 | Osborn | Mar. 4, 1947 |
| 2,462,983 | Mac Duff | Mar. 1, 1949 |
| 2,487,575 | Mercier | Nov. 8, 1949 |
| 2,500,627 | Chinn | Mar. 14, 1950 |
| 2,615,105 | Whitney | Oct. 21, 1952 |
| 2,646,070 | Holland | July 21, 1953 |
| 2,665,704 | Kanuch | Jan. 12, 1954 |